United States Patent [19]

Ashenafi

[11] Patent Number: 5,761,159
[45] Date of Patent: Jun. 2, 1998

[54] AUTOMATIC RADIO PROGRAM RECORDER

[76] Inventor: Solomon M. Ashenafi, P.O. Box 544, Wilsonville, Oreg. 97070

[21] Appl. No.: 771,668

[22] Filed: Dec. 24, 1996

[51] Int. Cl.⁶ .............................. H04B 1/20; H04H 9/00
[52] U.S. Cl. ........................................ 369/2; 369/7
[58] Field of Search .................. 369/7, 2, 84, 83; 360/1, 5, 6, 15, 16; 365/45; 455/6.3, 345, 346, 349, 351

[56] References Cited

U.S. PATENT DOCUMENTS

| | | | |
|---|---|---|---|
| 4,305,101 | 12/1981 | Yarbrough et al. | 369/7 |
| 5,483,506 | 1/1996 | Yoshioka et al. | 369/7 |
| 5,568,453 | 10/1996 | Okada | 369/7 |

FOREIGN PATENT DOCUMENTS

| | | | |
|---|---|---|---|
| 149331 | 2/1989 | Japan | 369/7 |
| 149332 | 2/1989 | Japan | 369/2 |
| 1162424 | 6/1989 | Japan | 369/7 |
| 1162426 | 6/1989 | Japan | 369/7 |
| 1162429 | 6/1989 | Japan | 369/7 |
| 2190535 | 11/1987 | United Kingdom | 369/7 |

*Primary Examiner*—Tan Dinh
*Attorney, Agent, or Firm*—Leonard Heyman

[57] ABSTRACT

A recording device includes a timer for automatically starting and stopping the recording mechanism, an input jack for accepting audio signals directly from an external audio source, and a power supply for the audio source. When a recording interval begins, the device supplies the external audio source with the required power via the power supply and the recording media for later playback. Alternatively, the device may be equipped with a microphone for accepting sound waves in addition to an electrical audio input. It is contemplated that the device be programmable to permit multiple start/stop intervals including daily and weekly intervals. The device can also be equipped with an audio amplifier and speaker for playback of recorded programs at a convenient time.

9 Claims, 3 Drawing Sheets

1

AUTOMATIC RADIO PROGRAM RECORDER

BACKGROUND OF INVENTION

This invention relates to a device for recording and reproducing audio signals or radio broadcasts on cassette tapes or other storage media.

Listeners turn on their radios in their homes, offices, motor vehicles, or outdoors with portable devices, etc., in order to listen to a variety of broadcasts that the media seeks to deliver them everyday. These broadcasts include: news and current affair programs, sports reports, weather forecasts, music shows, etc. However, because of various reasons, listeners miss out on listening to these broadcasts.

Although conventional radios and cassette-tape-recorders are available in different shapes and sizes with different features, they inherently have had disadvantages. One major difficulty is that cassette-tape-recorders are unable to solve listeners' scheduling problems. For example, a listener may be unable to listen to a particular radio broadcast due to the necessity of meeting other personal commitments. At present, the only available choice a listener has is to do one thing or the other, i.e., either miss the broadcast or fail to meet the commitment. Another common problem is that when a listener wishes to listen to a particular broadcast, he is subject to following the broadcast date and time. Another common problem is the necessity of being physically present to record a broadcast.

If the listener decides to physically wait around to listen to the broadcast, he is required to turn on the radio and dial the station in time in order to listen to the entire broadcast. If he wishes to record the broadcast, he still has to attend the recording process by pushing the "Record" and "Stop" buttons at the beginning and end of the broadcast.

Being unable to physically wait around to turn on the radio and listen, or worse yet, forgetting to push the recording button(s) will result in missing the broadcast all together.

If copies of these broadcasts are available for sale, the prices are often prohibitively high. Besides, listeners may be unaware of the existence of such services, if any, or where to get them from.

BRIEF SUMMARY OF THE INVENTION

The object of this invention is to provide an easily attachable device and method of recording an audio information signal or a broadcast in unattended mode.

Another object of the invention is to provide an easily attachable device and method of recording an audio information signal or a broadcast for both indoor and outdoor use.

Another object of the invention is to provide an easily attachable device and method of recording a single, daily or weekly broadcasts without requiring listeners to change or discard the conventional radios they currently own.

Accordingly, by performing the recording and reproducing functions, this easily attachable device serves as a complement to a conventional radio or other media when recording an audio information signal or a broadcast and reproducing the recorded signal or broadcast.

According to the invention, the device contains a microprocessor unit, a customized listener-friendly program, and an audio signal cable or other means for routing an audio information signal from its source to the audio signal receiving circuitry of the device.

Accordingly, further advantages of the invention include putting the listeners in control by solving their scheduling problems, and making broadcasts easily and conveniently accessible to listeners' lifestyles. Still further objects and advantages will become apparent from a consideration of the ensuing description and drawings.

DETAILED DESCRIPTION OF THE INVENTION

Figure 1:
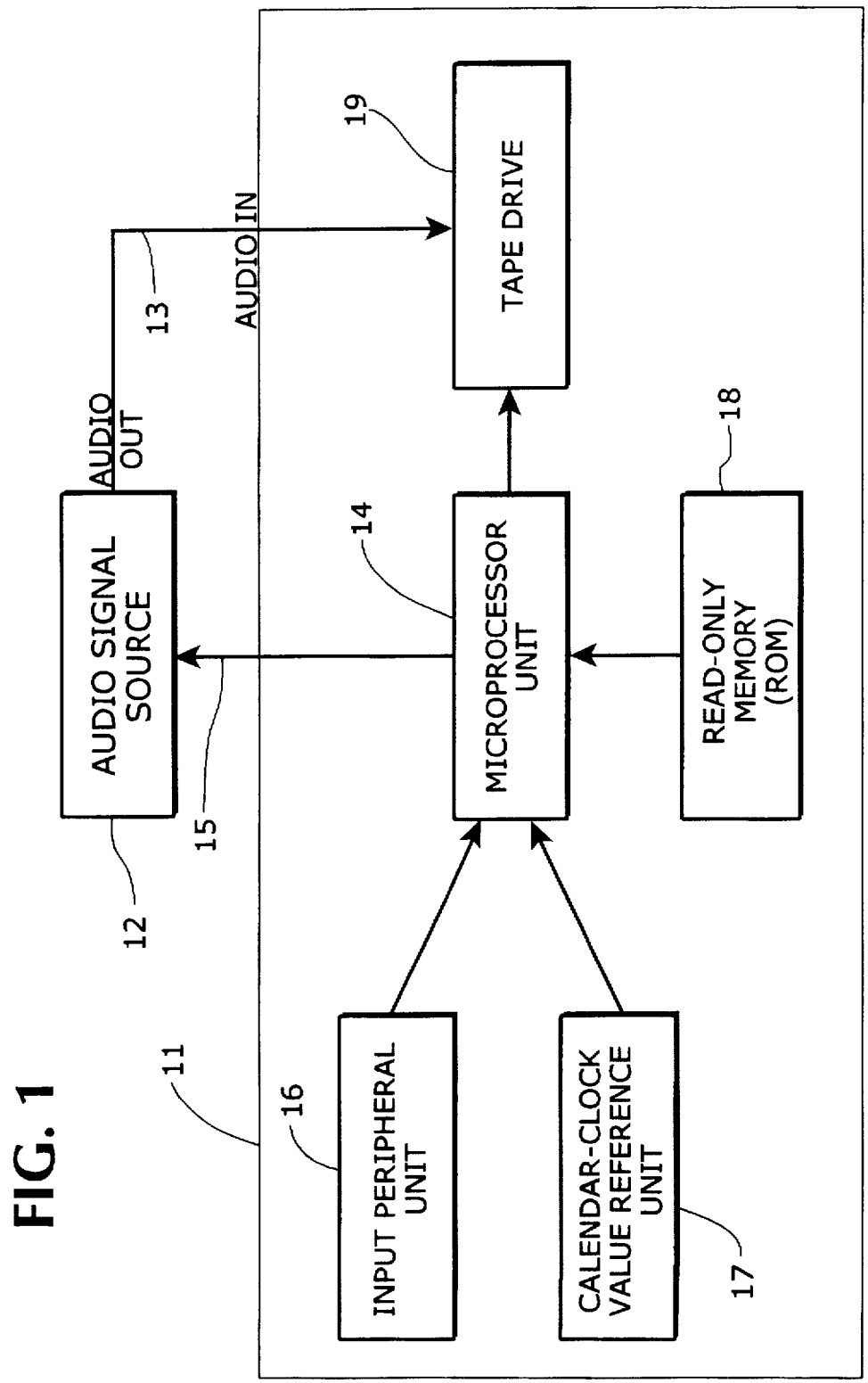
FIG. 1 is a block diagram representing a recorder according to a first preferred embodiment of the invention.

Referring to FIG. 1, an easily attachable recording device, indicated generally at 11, is used to record an audio information signal or a broadcast from its source 12.

The audio signal source 12, which may be a conventional radio, is connected to the attachable recording device 11 with an audio signal cable 13 and a power cable 15.

The audio signal cable 13 plugs into an audio output jack of the audio signal source 12 and into an audio input jack of the recording device 11.

The power cable 15 of the audio signal source 12 is connected to the recording device 11 so that a predetermined level of power supply to the audio signal source 12 is regulated by a microprocessor unit 14.

The microprocessor unit 14, which is the controlling center of the recording device 11, is connected to an input peripheral unit 16, a calendar-clock value reference unit 17, a read-only memory (ROM) 18, and a tape drive 19.

The input peripheral unit 16 is used by a listener to feed in an instruction into the microprocessor unit 14. In accordance with a predetermined listener-friendly program stored in the ROM 18, the microprocessor unit 14 carries out the tasks specified by the instruction set.

When a listener wishes to record a future broadcast, he feeds in an instruction set of pre-programming values from the input peripheral unit 16 into the microprocessor unit 14 where the instruction is decoded to enter in memory. With this instruction set, the microprocessor unit 14 is triggered and begins counting until the pre-programmed values are reached.

When the microprocessor unit 14 detects that the pre-programmed values in its memory match with the reference values on the calendar-clock value reference unit 17, in accordance with the start/end recording signals, it powers the recording device 11 up/down respectively. At the same time, by regulating the predetermined level of power supply in line with the start/end recording signals, the microprocessor unit 14 turns the audio signal source 12 on/off respectively.

Recording a tape starts with an audio information signal to be recorded. When the audio signal source 12 is on or playing, its audio information signal is present on its audio output jack. This audio information signal that is present on the audio output jack exit from the audio signal source 12 and is routed via the audio signal cable 13 to enter in the audio input jack of the recording device 11. Once the audio information signal is on the input jack of the recording device 11, it is then directed to the tape drive 19 where it is recorded in an audio cassette tape or other storage medium.

The audio information or broadcast signal that is being injected via the audio signal cable 13 into the tape drive 19 is recorded continuously in unattended mode until the microprocessor unit 14 powers the recording device 11 down and turns the audio signal source 12 off.

Thus, the audio signal cable 13 serves as a means by which an audio information signal is routed out from its source to the recording device 11. Optionally, any other audio information signal routing means, such as a microphone, may be used in place of the audio signal cable 13.

When an instruction is received from the input peripheral unit 16 to record a broadcast that is being aired, the microprocessor unit 14 responds by producing the control signals necessary for the continuous operation of the recording function.

Figure 2:
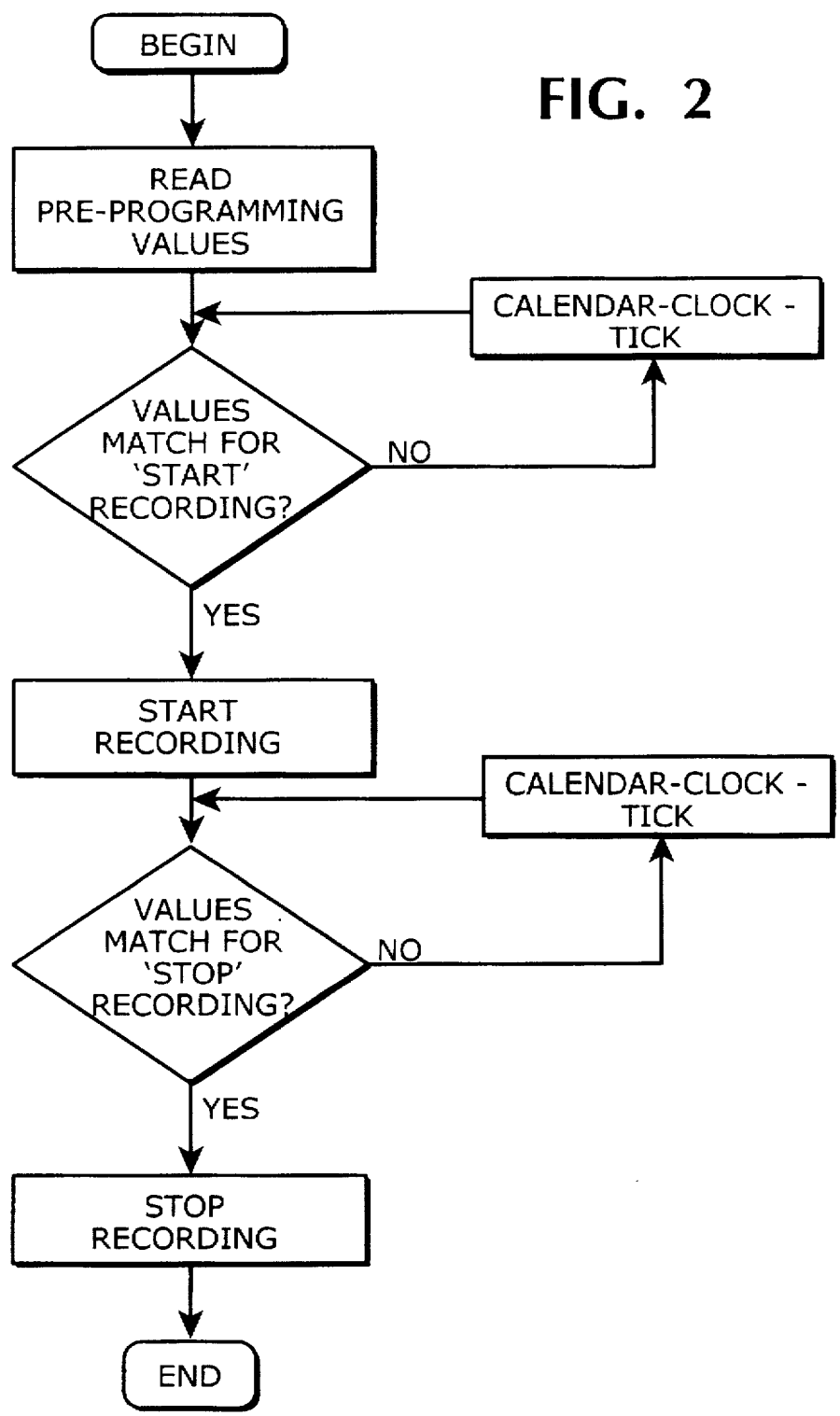
FIG. 2 is a flow chart showing programmed recording function of the first preferred embodiment.

FIG. 2 presents the sequence for programmed recording of the first preferred embodiment on an audio cassette tape or other storage medium.

When an instruction to record a broadcast in unattended mode is received, such instruction is decoded by the microprocessor unit 14 to enter in memory.

At first, the start/end pre-programming values are read. The program then makes a decision. It checks to determine if the 'begin' recording value in memory is equal to the value on the calendar-clock value reference unit 17. If the answer is 'No,' such comparison of values continues, for each calendar-clock tick, until the matching value is read. At that time, the programmed recording starts. Then, the next decision is made: Is the value on the calendar-clock value reference unit 17 equal to the 'end' recording value in memory? If the answer is 'No,' the next comparison of values is made for each calendar-clock tick. This process continues until the values match. Then, the recording function is discontinued and the program ends.

The entire program is repeated for each kind of recording mode, i.e., single, daily or weekly, selected by the listener.

Figure 3:
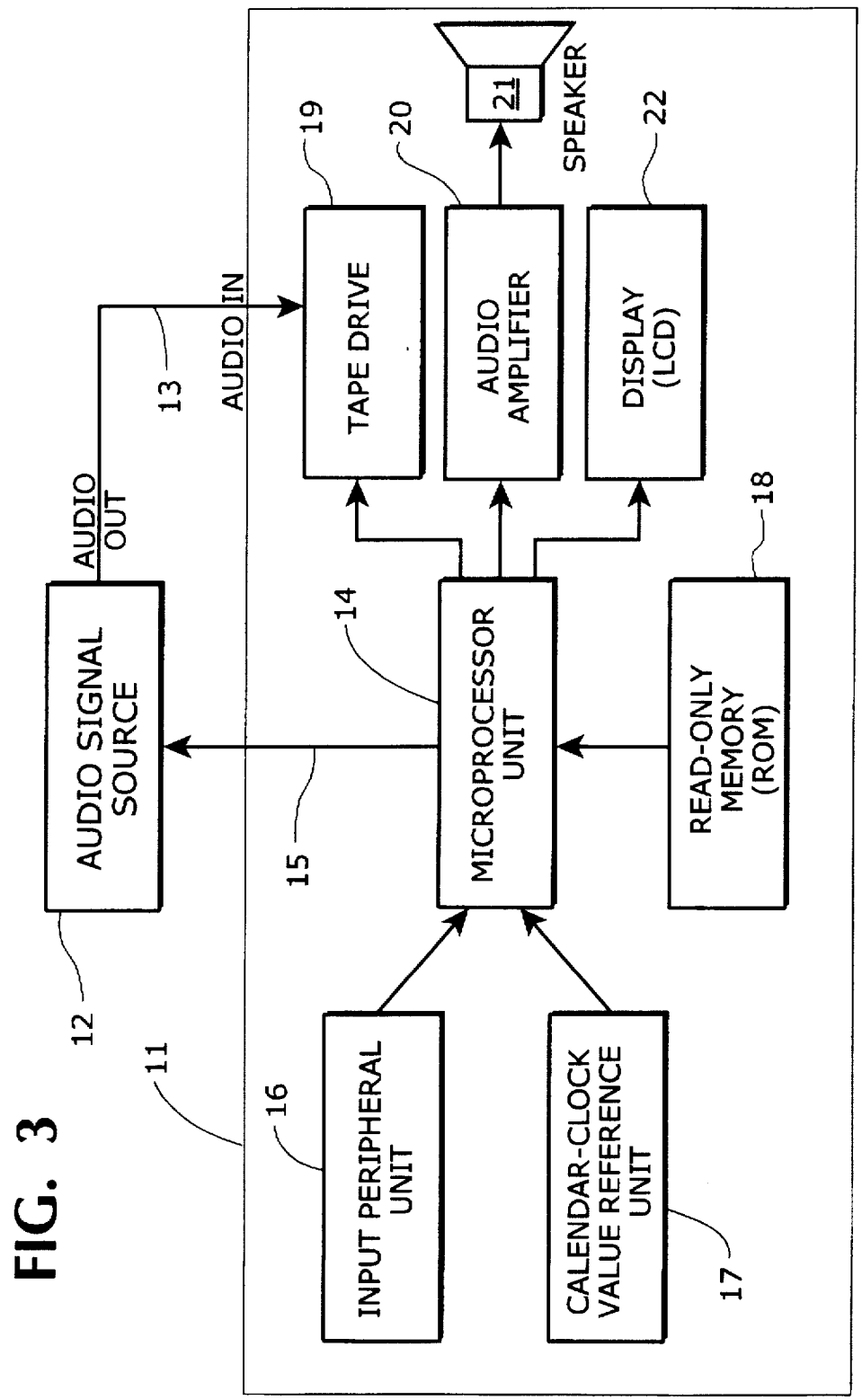
FIG. 3 is a block diagram representing a second preferred embodiment of the invention having a reproduction means, such as a speaker, and a visual display means, such as a Liquid-Crystal Display (LCD).

FIG. 3 represents a second preferred embodiment of the invention, in which a playback function and a display section are provided.

When a listener feeds in an instruction from the input peripheral unit 16, the microprocessor unit 14 detects the signal and produces the information on a display 22.

When a pre-recorded cassette is played back, the audio signal on the tape is amplified by an audio amplifier 20 and converted back to the actual sound by a speaker 21.

While there has been shown and described two preferred embodiments of the recording and reproducing device of this invention, it is understood that reasonable variation and modification, including integrating this device with other related products such as video cassette recorders, etc., can be made by those skilled in the art without departing from the invention.

I claim:

1. A recording device comprising:

an input for receiving electrical signals representing audible sound;

a recording mechanism capable of encoding and recording said electrical signals on recording, media for later playback;

a programmable timer for starting and stopping said recording mechanism for operating said recording mechanism during at least one user-defined interval of time;

a power output connector for providing electricity at a required voltage to an external audio source such that said audio source receives its operating power from said recording device;

said programmable timer automatically energizing said power output connector during said at least one user-defined interval of time.

2. The recording device set forth in claim 1, wherein said input is selectably connected to one of an input jack and a microphone.

3. The recording device set forth in claim 1 wherein said user-defined interval of time is defined by data entered through an input peripheral unit connected to the programmable timer.

4. The recording device set forth in claim 3 wherein the data includes start time and stop time for the interval.

5. The recording device set forth in claim 4 wherein the data further includes a start day of the week and stop day of the week and a means for alternatively setting a mode for a single interval of time, a daily interval of time, and weekly interval of time wherein when the single mode is set only a single recording is made; when the daily mode is set, the interval repeats at the same time every day; and when the weekly mode is set, the interval repeats at the same time on the same day every week.

6. The recording device set forth in claim 1 wherein said recording mechanism is further capable of decoding and reproducing said electrical signals in a playback mode, said recording device further comprising an audio amplifier for amplifying said electrical signals and a speaker for converting said electrical signals into audible sound waves.

7. The recording device set forth in claim 3 further comprising a display for displaying said data.

8. The recording device set forth in claim 4 further comprising a display for displaying said data.

9. The recording device set forth in claim 5 further comprising a display for displaying said data.

* * * * *